United States Patent [19]

Kempf et al.

[11] Patent Number: 4,461,400

[45] Date of Patent: Jul. 24, 1984

[54] VALVELESS METERING DISPENSER

[75] Inventors: Dennis D. Kempf, San Jose, Calif.; Carlos A. Cordero, San José, Costa Rica

[73] Assignee: FMC Corporation, Philadelphia, Pa.

[21] Appl. No.: 297,606

[22] Filed: Aug. 31, 1981

[51] Int. Cl.³ ............................................. G01F 11/26
[52] U.S. Cl. ...................................... 222/1; 222/175; 222/456; 222/457; 239/598
[58] Field of Search .............. 222/175, 454, 456, 457, 222/1, 457.5, 437, 434, 306, 307, 439; 239/152, 154, 253, 598, 601; 221/288

[56] References Cited

U.S. PATENT DOCUMENTS

| 1,684,313 | 9/1928 | Graham | 222/439 |
| 2,820,577 | 1/1958 | Winters et al. | 222/306 |
| 3,391,836 | 7/1968 | Hartley | 222/454 |
| 4,298,038 | 11/1981 | Jennings | 222/437 |

FOREIGN PATENT DOCUMENTS 797609  7/1958  United Kingdom ................ 222/457
883371 11/1961  United Kingdom ................ 222/175

Primary Examiner—Joseph J. Rolla
Assistant Examiner—Kevin P. Shaver
Attorney, Agent, or Firm—Eugene G. Horsky

[57] ABSTRACT

A valveless dispenser and method of operating the same is disclosed for first gravitatinally collecting a measured volume of granular material from an elevated supply source by moving the dispenser into a first position, and for thereafter discharging the measured volume of material while precluding discharge of unmeasured material from the tank by moving the dispenser to a second position. The dispenser includes a wand, a measuring chamber, and a discharge chute all communicating with each other at a junction and all having longitudinal axes lying in a common substantially vertical plane. In one embodiment the wand is twisted about its longitudinal axis between said two positions; and in the other embodiments the wand is swung in the vertical planes between said two positions while maintaining said axes substantially vertical.

20 Claims, 7 Drawing Figures

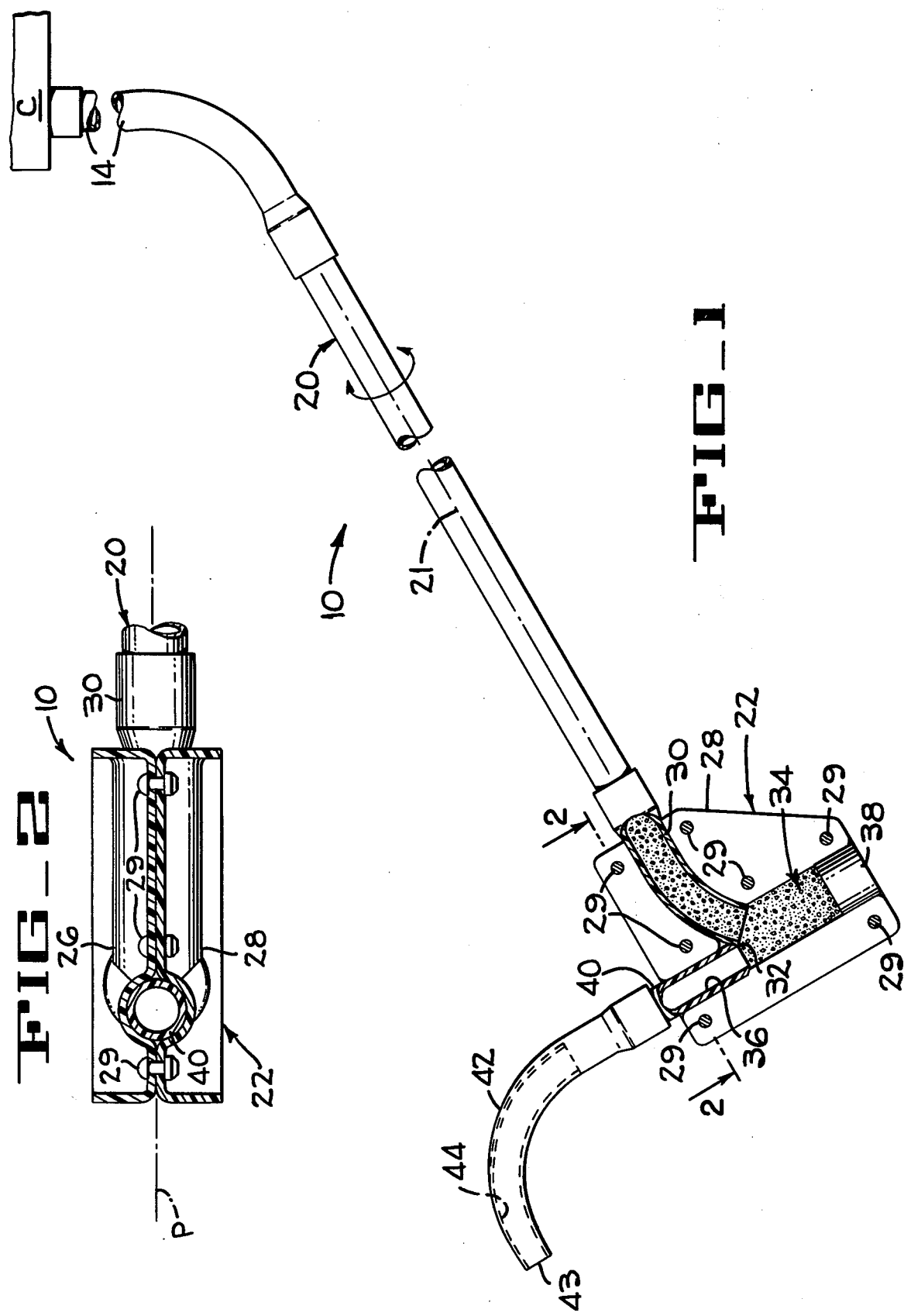

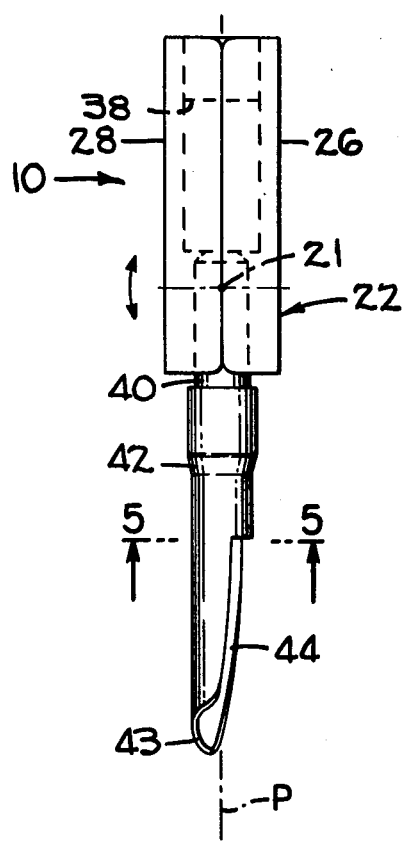
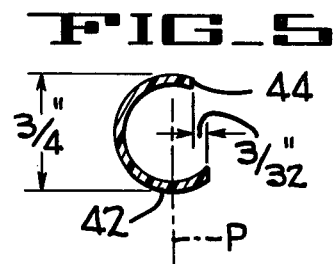
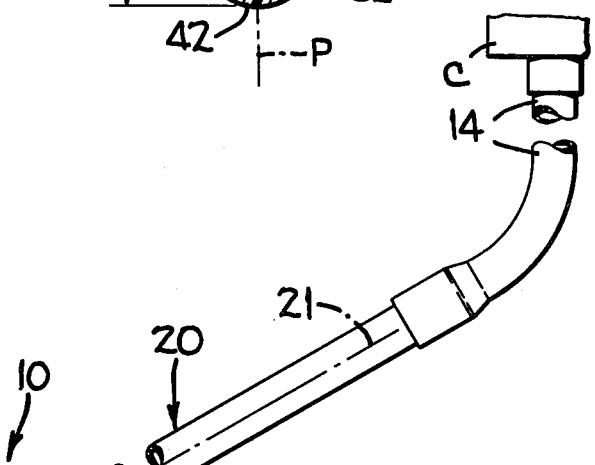
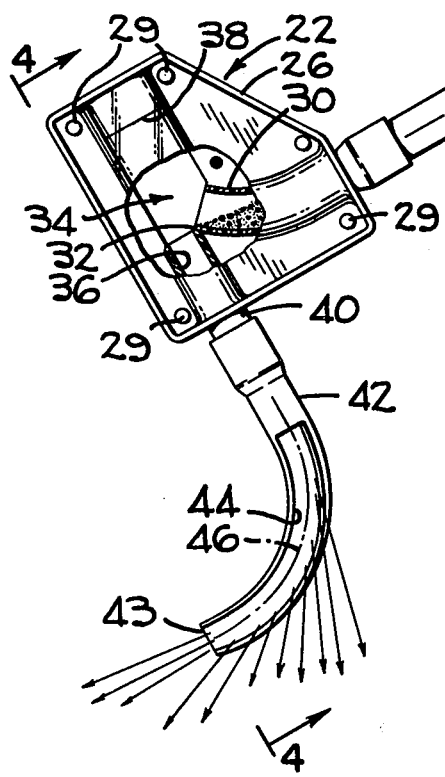

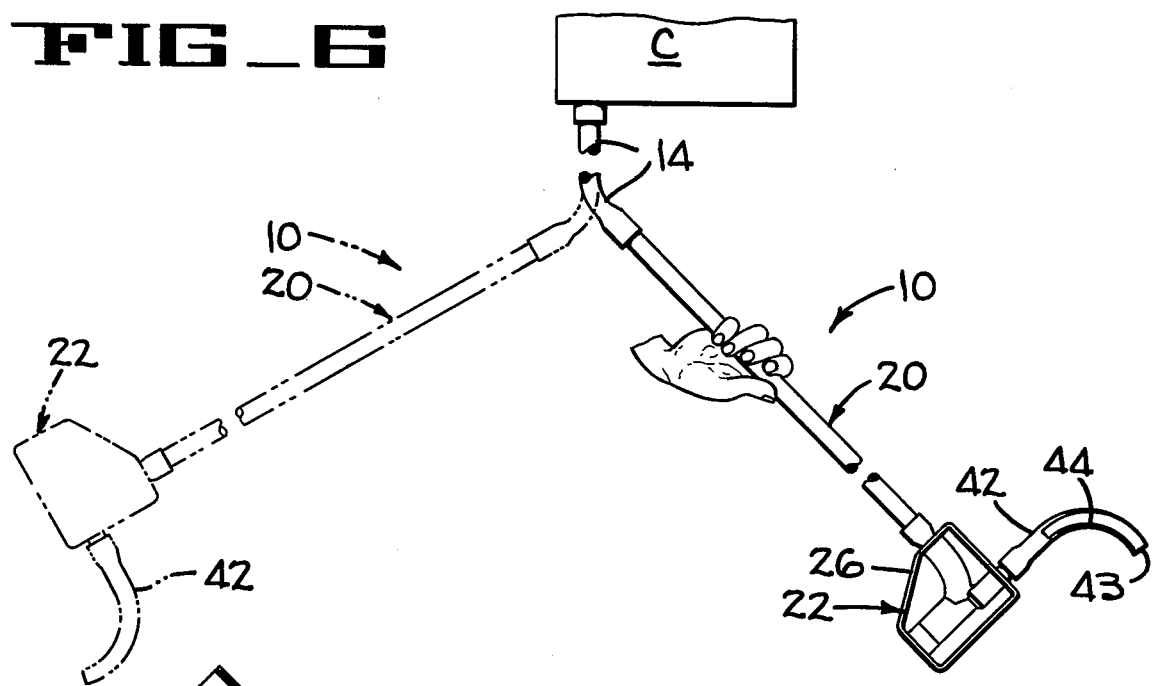
FIG_6
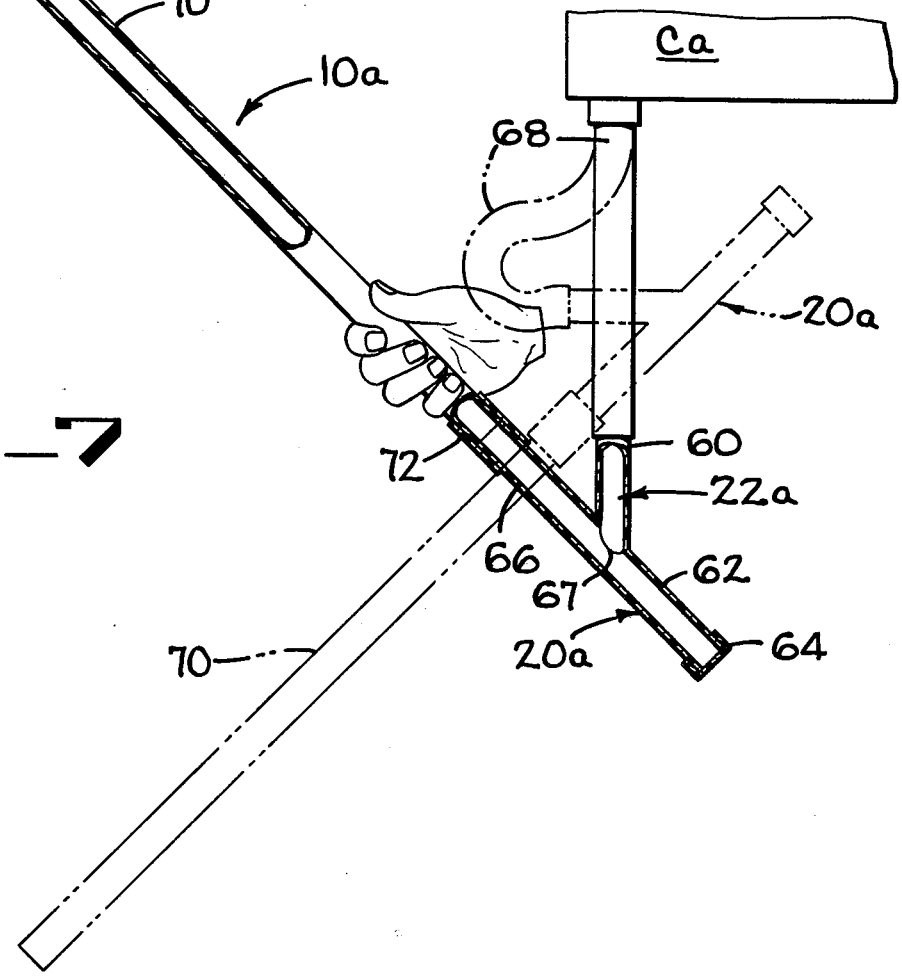
FIG_7

4,461,400

VALVELESS METERING DISPENSER

CROSS REFERENCE TO RELATED APPLICATIONS

The dispenser of the present invention is an improvement over the dispenser disclosed in the U.S. Kempf application Ser. No. 259,720 filed on May 1, 1981, now U.S. Pat. No. 4,407,434.

BACKGROUND OF THE INVENTION

1. Field of the Invention

The present invention relates to method and apparatus for dispensing granular material, and more particularly relates to a valveless metering dispenser which first accumulates a measured amount of flowable material when held in one position and then discharges only the collected material when moved to a second position.

2. Description of Prior Art

The aforementioned Kempf patent discloses a resilient metering tube connected to a canister having a flowable material therein. A pinch valve includes two pinch means for sequentially closing the tube at two locations spaced a predeterminded distance apart thereby collecting a measured amount of granular material therebetween which material is discharged through a hollow wand upon release of the pinch valve.

Although the mechanism disclosed in assignees above mentioned patent, and the apparatus of the present invention are intended to be used to dispense fertilizer, highly toxic pesticides, or similar granular material from a backpack carried by an unskilled manual worker for distribution about the trunks of banana trees or the like, it is apparent that the apparatus may be used in other environments with other types of granular materials.

SUMMARY OF THE INVENTION

The valveless metering dispenser of the present invention includes a tubular wand which is connected to an elevated container of granular material by a flexible tube or the like. The granular material flows by gravity from the elevated container downwardly through the tube and wand to a junction which communicates with a measuring chamber having a closed outer end and also communicates with a discharge chute.

In the several embodiments of the invention the longitudinal axes of the wand and measuring chamber, and/or discharge nozzle are angled relative to each other enabling the wand to be manipulated so that the measuring chamber is first positioned below the junction and is filled with a measured volume of granular material with the flow from the container terminating at the junction due to relatively high internal flow friction of the granular material. The wand is then manipulated so that the junction and discharge chute are below the measuring chamber and above the outlet end of the wand at the junction thereby discharging the measured volume of material from the dispenser. In the preferred embodiment of the invention the wand is pivoted approximately 180° about a linear portion of its longitudinal axis when moved between the chamber filling and discharging positions. In the other embodiments of the invention the longitudinal axes of the wand, measuring chamber, and discharge nozzle lie in a generally vertical plane and the wand is swung by an operator while maintaining the axes substantially vertical, but not necessarily in the same vertical plane. The wand is swung in one direction to fill the measuring chamber and in the opposite direction to discharge the granular material from said chamber through said discharge chute.

BRIEF DESCRIPTION OF THE DRAWINGS

FIG. 1 is a side elevation, partially in section and partially broken away, of the preferred embodiment of the valveless metering dispenser of the present invention shown in position to receive a predetermined volume of granular material in its measuring chamber, said chamber being filled.

FIG. 2 is a section taken along lines 2—2 of FIG. 1.

FIG. 3 is a side elevation similar to FIG. 1 but illustrating the dispenser pivoted to its discharge position.

FIG. 4 is an end view looking in the direction of FIGS. 4—4 of FIG. 3.

FIG. 5 is a section taken along lines 5—5 of FIG. 4 illustrating the cross-sectional configuration of an elongated discharge port.

FIG. 6 is an operational view of the dispenser illustrated in FIG. 1 but illustrating a different mode of operation.

FIG. 7 is an operational view of a second embodiment of the dispenser shown in two operative positions.

DESCRIPTION OF THE PREFERRED EMBODIMENT

The term "granular material" as used in the specification and claims is intended to cover all materials, including particulate, flowable powdery materials, or dust, which do not flow freely as a liquid but have factors of internal flow friction sufficient to stop flow from the supply source at the aforementioned junction when the wand is in either of its operative positions.

The first and preferred embodiment of the valveless metering device 10 (FIGS. 1-6) of the present invention is illustrated as being connected to a container C of a backpack assembly (not shown) by a flexible tube 14 for gravitationally dispensing a measured volume of granular material from the backpack container C onto the ground above the roots of banana trees or the like.

The dispenser 10 comprises a rigid, tubular wand 20 having its inlet end connected to the flexible tube 14 and having a volumetric dispensing head 22 connected to its discharge end. In order to provide a suitable gravitational feed system, the flexible tube 14 is made rather short to assure that an operator must grip the wand 20 in such a way as to provide a near vertical feed path from the backpack container C into the inlet end of the wand, and to assure a working angle of the wand's longitudinal axis 21 of a least 30° relative to a horizontal plane.

The dispensing head 22 is preferably constructed of two complementary molded sections 26,28 which are secured together by connectors, such as rivets 29, and by an adhesive, such as a butyl rubber caulk, which acts as a seal preventing the granular material from escaping from the head except during normal discharge operations. An inlet passage in the head 22 is defined by a curved tube 30 which is rigidly connected between the head sections 26,28 by clamping and by adhesive. The discharge end of the wand 20 is rigidly secured to the tube 30 in flow communication. The other end of the tube 30 communicates with a junction 32 which, in turn, communicates with a volumetric measuring chamber 34 and a discharge passage 36. The measuring chamber 34 is closed outwardly of the junction 32 by a plug 38 which is preset during manufacture to provide the desired volume of granular material. When unskilled laborers are employed to operate the dispenser with toxic material, it is important that the plug 38 be rigidly secured in the desired position of adjustment by the manufacturer thus preventing the operator from altering the volume of toxic granular materials which could damage the trees if an excessive amount of material is dispensed. It is to be understood, however, that the manufacturer may position the plug in any one of a number of locations in the measuring chamber 34 to provide an adjustment for handling different volumes of material.

In order to evenly spread the discharged granular material around the plant or tree trunk in a rather wide path, a flow restricting tube 40 is clamped in the passage 36 by the rivets 29 and the adhesive and includes a portion projecting outwardly of the passage 36. It is apparent that the inside diameter of the tube 40 may be sized to provide the desired rate of flow for granular materials having different factors of internal flow friction. A curved discharge chute 42 is rigidly secured to the tube 40 and is preferably formed with an open end 43 which communicates with an elongated curved side discharge port 44. When the curved discharge chute 42 (FIGS. 3-6) is in its discharge position and has its longitudinal axis 46 lying in a vertical plane P, the lower edge of the port extends outwardly relative to the vertical plane about 3/32 of an inch further than the upper edge as illustrated in FIG. 5. The discharge chute 42 with its side port 44 will discharge the material in a wide fan as shown in FIG. 3 rather than in a narrow strip as would occur if all material was discharged out of a circular opening.

In the preferred embodiment of the invention, the longitudinal axes 21 of the wand 20, the measuring chamber 34 and the curved discharge nozzle 42 lie in a common plane, which plane is the vertical plane P when the head 22 is positioned either in its volumetric charging or discharging positions.

The two molded sections 26,28 of the dispensing head 22 are formed from a transparent plastic. When the clamping surfaces of the two molded sections 26,28 are coated with the adhesive caulking and are secured together with the inlet tube 30, plug 38 and flow restricting tube 40 therebetween, the plastic surfaces which define the measuring chamber 34 and junction 32 remain transparent. Thus, the transparent plastic measuring chamber and junction act as a visual volumetric gauge permitting the operator to determine when the container C is empty, and also permitting the operator to determine whether or not the measuring chamber 34 is properly filled by merely looking at the dispensing head 22. The adhesive caulking is preferably opaque thereby highlighting the transparent measuring chamber 34.

The illustrated metering dispenser 10 and backpack assembly are provided for right handed operators and accordingly has its side discharge port 44 on the left side of the head 22 when in the discharge position of FIG. 4. Thus, the operator can simultaneously see the transparent measuring chamber or gauge, the fan discharge from the port 44 and the arcuate area which he desired to treat with the granular material.

The dispenser 10 of the first embodiment of the invention may be operated in two different ways. The preferred mode of operation is to twist the wand approximately 180°, as indicated by the arrows in FIGS. 1 and 4, about its axis 21 to shift the dispensing head 22 between its charging and discharging positions.

More particularly, the backpack container C is filled with a granular material and the backpack (not shown) is then strapped on the back of an operator who walks from tree to tree to dispense the material around the trees. The operator fills the measuring chamber 34 by twisting the wand 20 substantially about its longitudinal axis 21 to position the measuring chamber below the axis of the wand and in substantially the vertical plane P. At this time the operator's hand should be well back near his right leg so that the short flexible hose is near vertical thereby assuring sufficient gravitational feed of the material into the measuring chamber 34. Because of the rather high internal flow friction of the granular material, the upper surface of the material will not rise upwardly into the discharge passage 36 and flow restricting tube 40 but will rise only to the level indicated in FIG. 1 which the operator can see through the clear plastic walls of the measuring chamber 34 and the junction 32. The operator then twists the wand approximately 180° about its longitudinal axis, and as the granular material begins to discharge, the operator pushes the wand forward near one side of the tree trunk or plant and then pulls it back and finally pushes it forward near the other side of the trunk to define a U-shaped discharge path. This path extends approximately 180° over the area adjacent the tree being treated. This operation is then repeated for other trees at the rate of about 850 applications per hour when dispensing about 17 grams of a high density-low volume granular nematicide.

As illustrated in FIG. 6, the dispenser 10 may be operated in an alternate manner if low foliage or the like makes it difficult to twist the wand. The alternate mode of operation involves first orienting the axes of the several passages in the head in a vertical plane P. Then swinging the wand 20 and head 22 rearwardly of the operator to the solid line position of FIG. 6 for capturing a measured volume of granular material in the measuring chamber 34. The head is then swung to the dotted line discharge position. The operator moves the head horizontally as previously described to dispense the material from the nozzle 42 evenly over the ground in an arc of about 180° around the trunk of the tree.

A second embodiment of the valveless dispenser 10a of the present invention is illustrated in FIG. 7 and is similar in concept to the preferred embodiment. The second embodiment of the invention comprises a combined wand 20a and dispensing head 22a in the form of a pipe Y-branch having an inlet conduit 60, a conduit which defines a measuring chamber 62 closed by a cap 64, and a discharge conduit 66. The joint between the inlet conduit 60, the measuring chamber 62, and the discharge conduit 66 define a junction 67 which establishes flow communication between the several conduits. A flexible hose 68 connects the inlet conduit 60 of the wand 20a to the backpack container Ca. A discharge chute 70 is rigidly connected to the discharge conduit 66 by a coupling 72 and is in the form of an open ended pipe extension. The combined wand 20a and dispensing head 22a is preferably formed from light weight plastic tubing with the parts connected together by an adhesive. Hereinafter and in the claims appended hereto the combined wand and dispensing head will be referred to as the wand 20a.

The operation of the second embodiment of the invention is substantially the same as the alternate embodiment described above except that the wand 20a is pivoted forwardly of the operator to receive the measured volume of material in the measuring chamber 62, and is thereafter pivoted to the dotted line position to discharge the measured volume of material about the plants being treated.

Although the wand 20a may be somewhat difficult to operate around trees having low dense foliage because of potential interference between the discharge chute 70 and the low foliage when tilted upwardly to receive a measured volume the dispenser 10a, as well as the dispensing head 22 of the first embodiment of the invention, are ideally suited to dispense granular material around coffee, fruit and nut trees; or around corn and vegetables such as potatoes, tomatoes, and peppers when single plant treatment is desired.

Although the preferred use of the valveless metering dispenser has been described in conjunction with the manual dispensing of a granular nematicide, it will be apparent that the dispenser may be used to dispense other granular materials for other purposes. It will also be understood that the meaning of the term "valveless" metering dispenser is that the dispenser uses no valves when in operation.

When the dispenser 10 or 10a is not being used, a hook or the like (not shown) may be secured to the dispenser and hooked on the backpack assembly (not shown) to maintain the dispensing head in an upright stowed position.

From the foregoing description it is apparent that the valveless dispenser of the present invention includes an elongated wand which gravitationally receives granular material and directs it into a dispensing head having a measuring chamber on one side of the longitudinal axis of the wand and a discharge nozzle on another side of the axis, both of which communicate with the wand at a junction. During operation, the wand of the preferred embodiment is pivoted approximately 180° about its longitudinal axis between its material receiving and material discharging positions. Alternately, the wand and longitudinal axes of the passages in the metering head are maintained substantially vertical and may be swung in substantially vertical planes about axes substantially normal to said plane between its material receiving and material discharging positions. During operation the dispenser requires no valves.

Although the best mode contemplated for carrying out the present invention has been shown and described it will be apparent that modification and variation may be made without departing from what is regarded to be the subject matter of the invention.

What is claimed is:

1. A valveless metering dispenser for gravitationally dispensing a measured volume of granular material from an elevated container adapted to receive a supply of granular material comprising: conduit means connected at one end to said container and including a tubular wand; means defining a measuring chamber; means defining a discharge chute having a discharge opening; each of said wand, measuring chamber and discharge chute having a longitudinal axis; and means including a valveless junction interconnecting said wand, said measuring chamber and said discharge chute in flow communication, with the axes thereof in a common plane, wherein, by an operator of the dispenser swinging said wand between first and second positions while maintaining said common plane generally vertical, said measuring chamber is lower than said discharge chute in said first position and is filled with granular material flowing from said wand and past said junction, and is above said discharge chute in said second position and gravitationally discharges its measured volume of granular material past said junction and into said discharge chute while precluding the flow of granular material from said wand.

2. An apparatus according to claim 1 wherein said conduit means includes a flexible tube interconnecting said container and said wand.

3. An apparatus according to claim 1 wherein said wand is manually swung from said first position forwardly relative to the operator to said second position.

4. An apparatus according to claim 1 wherein said wand is manually swung from said first position rearwardly to said second position relative to the operator.

5. An apparatus according to 1 wherein said means defining said measuring chamber includes a removable plug, and wherein said removable plug is adjustably secured in said chamber in one of a plurality of desired positions remote from said valveless junction for varying the measured volume of material in said chamber.

6. An apparatus according to claim 1 additionally comprising restriction means included in said discharge chute for reducing the rate of flow and increasing the length of time required for discharging the granular material from said discharge chute.

7. A valveless metering dispenser for gravitationally dispensing a measured volume of granular material from an elevated container adapted to receive a supply of granular material comprising: conduit means connected at one end to said container and including a tubular wand; means defining a measuring chamber; a curved tubular discharge chute; and means including a valveless junction interconnecting said wand, said measuring chamber, and said discharge chute in flow communication; said curved tubular discharge chute having an elongated curved discharge opening in the wall thereof, whereby granular material discharged from said chute through said opening is spread as a wide fan of granular material.

8. A dispenser as defined in claim 7 wherein said wand, said measuring chamber, and said discharge chute each have a longitudinal axis and are interconnected in flow communication with the longitudinal axes thereof in a common plane, and wherein, by an operator of the dispenser swinging said wand between first and second positions while maintaining said common plane generally vertical, said measuring chamber is lower than said discharge chute in said first position and is filled with granular material flowing from said wand and past said junction, and is above said discharge chute in said second position and gravitationally discharges its measured volume of granular material past said junction and into said discharge chute while precluding the flow of granular material from said wand.

9. An apparatus according to claim 7 wherein the outer end of the tubular chute is open.

10. An apparatus according to claim 7 and additionally comprising restriction means included in said discharge chute for reducing the rate of flow and increasing the length of time required for discharging the measured volume of granular material from said discharge chute.

11. An apparatus according to claim 7 wherein said elongated curved opening is partially defined by upper and lower curved edges and wherein said lower curved edge projects outwardly of said upper curved edge about 3/32 of an inch relative to a vertical plane containing the longitudinal axis of said tubular chute when said chute is in its discharge position.

12. An apparatus according to claim 11 and additionally comprising restriction means included in said discharge chute for reducing the rate and increasing the length of time required for discharging the granular material from said discharge chute.

13. A valveless metering dispenser for gravitationally dispensing a measured volume of granular material from a container adapted to receive a supply of granular material comprising: movable conduit means connected to said container for receiving a gravitational flow of granular material therefrom when said container is elevated relative to said conduit means; means defining a measuring chamber; a curved tubular discharge chute; and means including a valveless junction interconnecting said conduit means, said measuring chamber and said discharge chute in flow communication and, when disposed in a first position, permitting granular material to flow by gravity from said conduit means past said junction and into said measuring chamber and, when disposed in a second position, permitting granular material to flow by gravity from said measuring chamber past said junction and into said discharge chute while concomitantly precluding the flow of granular material from said conduit means, said curved tubular discharge chute having an elongated curved slot which is shaped to provide for discharge of the granular material from such chute as a fan-shaped dispersion.

14. An apparatus according to claim 13 wherein said measuring chamber is closed at the end thereof remote from said valveless junction by a plug which is adjustable relative to said chamber for varying the volume of said chamber.

15. An apparatus according to claim 13 further including restriction means in said discharge chute for reducing the rate of flow therethrough and thereby increasing the length of time required for discharging the measured volume of granular material from said discharge chute and facilitating a controlled dispersion of such material.

16. An apparatus according to claim 13 wherein the outer end of the chute is open.

17. An apparatus according to claim 16 wherein said elongated slot is defined by curved walls which extend from said outer end of said tubular chute and are arranged in converging relationship.

18. An apparatus according to claim 17 further including restriction means in said discharge chute for reducing the rate of flow therethrough and thereby increasing the length of time required for discharging the granular material from said discharge chute and facilitating a controlled dispersion of such material.

19. A method of gravitationally dispensing a measured volume of granular material from an elevated container connected to a valveless metering dispenser which includes a wand, a volumetric measuring chamber and a discharge chute which are in flow communication at a common valveless junction with the longitudinal axes thereof lying substantially in a common plane, comprising the steps of swinging said wand forwardly and rearwardly between first and second positions while maintaining said common plane generally vertical, whereby the measuring chamber is below the container and the valveless junction in said first position and receives a measured volume of granular material flowing from said wand and pass the valveless junction and is above the valveless junction and the discharge chute in said second position and discharges its measured volume of granular material past the valveless junction and into the discharge chute while precluding the flow of granular material from the wand.

20. A method according to claim 19 wherein said wand is connected to said container by a flexible tube; and additionally comprising the steps of maintaining the flexible tube in a near vertical position when filling said measuring chamber, and varying the angle of the flexible tube relative to a vertical plane when discharging the material in an arc of approximately 180° on the soil around a plant by decreasing the angle of the tube when treating each side of the plant and by progressively increasing the angle of the tube when moving the discharge chute toward the center of the arc.

* * * * *